(12) United States Patent
Ohtake et al.

(10) Patent No.: US 7,106,037 B2
(45) Date of Patent: Sep. 12, 2006

(54) SWITCHING-TYPE CONSTANT CURRENT POWER SUPPLY DEVICE

(75) Inventors: Tetsushi Ohtake, Tsurugashima (JP); Shigeyuki Ohsugi, Tsurugashima (JP)

(73) Assignee: Toko, Inc., Tokyo (JP)

( * ) Notice: Subject to any disclaimer, the term of this patent is extended or adjusted under 35 U.S.C. 154(b) by 267 days.

(21) Appl. No.: 10/879,918

(22) Filed: Jun. 28, 2004

(65) Prior Publication Data

US 2005/0002134 A1    Jan. 6, 2005

(30) Foreign Application Priority Data

| Jul. 2, 2003 | (JP) | ............................. 2003-190365 |
| Jul. 11, 2003 | (JP) | ............................. 2003-195520 |
| Aug. 22, 2003 | (JP) | ............................. 2003-298305 |

(51) Int. Cl.
  *G05F 1/56*     (2006.01)
(52) U.S. Cl. ...................... 323/285; 323/222; 323/267; 323/351
(58) Field of Classification Search ................ 323/222, 323/267, 285, 351
  See application file for complete search history.

(56) References Cited

U.S. PATENT DOCUMENTS

| 5,170,333 | A | * | 12/1992 | Niwayama ................ 363/21.11 |
| 5,375,029 | A | * | 12/1994 | Fukunaga et al. ........... 361/101 |
| 5,479,090 | A | * | 12/1995 | Schultz ....................... 323/284 |
| 6,020,729 | A | * | 2/2000 | Stratakos et al. ............ 323/283 |
| 6,194,883 | B1 | * | 2/2001 | Shimamori .................. 323/283 |

FOREIGN PATENT DOCUMENTS

| JP | 11-68161 A | 3/1999 |
| JP | 2001-215913 A | 8/2001 |
| JP | 2002-203988 A | 7/2002 |

OTHER PUBLICATIONS

Fujitsu Semiconductor Data Sheet, DS04-27203-7E for "Switching Regulator Controller MB 3778".

* cited by examiner

*Primary Examiner*—Jeffrey Sterrett
(74) *Attorney, Agent, or Firm*—Cohen, Pontani, Lieberman & Pavane (57) ABSTRACT

Disclosed is a switching-type constant current power supply, which comprises an alteration circuit 9 provided on the output side of a power conversion circuit 3 together with a voltage detection circuit 7, and a feedback circuit 8 provided between the voltage detection circuit 7, a current detection circuit 5 and a control circuit 4. The alteration circuit 9 is operable, during a current flow period where a load current IL is flowing, to set the signal level of a second feedback signal F2 at a value less than a reference voltage Vref to be supplied to a common error amplifier EA1 in a control circuit 4, and operable, during a current cut-off period where the load current IL is not flowing, to set the signal level of the second feedback signal F2 at a value greater than the reference voltage Vref. During the current cut-off period, the feedback circuit 8 is operable to supply the second feedback signal F2 to the control circuit 4 so as to substantially discontinue the operation of the power conversion circuit 3. The switching-type constant current power supply of the present invention can stabilize the load current even under the condition that a load (e.g. display including LEDs) is repeatedly turned on and off.

23 Claims, 7 Drawing Sheets

SWITCHING-TYPE CONSTANT CURRENT POWER SUPPLY DEVICE

TECHNICAL FIELD

The present invention relates to a switching-type constant current power supply device for supplying a stable current to a load which is repeatedly turned on and off.

BACKGROUND OF THE INVENTION

Generally, a switching-type power supply device is used as a constant voltage source for supplying a stable voltage to a load. The switching-type power supply device can also be configured as shown in FIG. 1 to allow a feedback signal to be proportional to an output current, so that it can be used as a constant current source for supplying an approximately constant current to a load.

Figure 1:
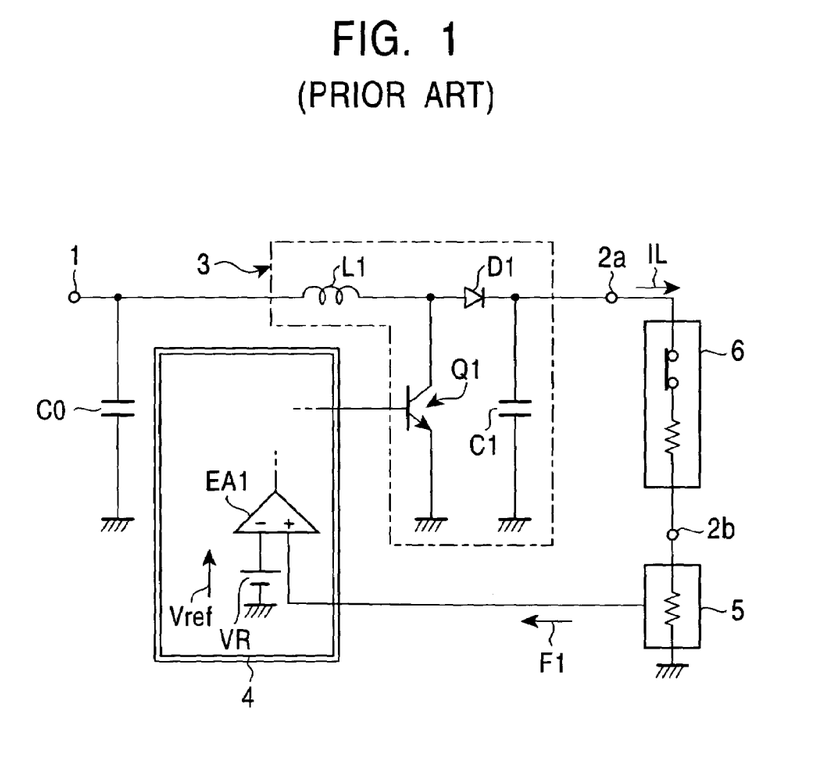
FIG. 1 is a circuit diagram of a conventional switching-type power supply device for use as a constant current source.

In FIG. 1, the reference numeral 1 indicates an input terminal for receiving power from an external battery, and the reference numerals 2a and 2b indicate a pair of output terminals for stably supplying a given current to a load which is connected therebetween. A power conversion circuit 3 is connected between the input terminal 1 and one 2a of the output terminals. The power conversion circuit 3 is composed of a choke coil L1, a switching transistor Q1, a rectifier diode D1 and a smoothing capacitor C1 which are connected together to form a step-up chopper converter.

A current detection circuit 5 is connected between the other output terminal 2b and a ground as a zero potential reference point. The current detection circuit 5 is operable to detect a current IL flowing through a load 6 (hereinafter referred to as "load current") so as to generate a feedback signal F1 proportional to the load current IL. Further, a control circuit 4 including a reference voltage source VR and an error amplifier EA1 is connected between the power conversion circuit 3 and the current detection circuit 5 to drive the power conversion circuit 3 in accordance with the signal level of the feedback signal F1 supplied from the current detect circuit 5.

On the assumption that a control IC for conventional external-commutation PWM control systems is used as the control circuit 4, the circuit illustrated in FIG. 1 is configured such that a reference voltage Vref generated by the reference voltage source VR is supplied to an inverting input terminal (−) of the error amplifier EA1, and the feedback signal F1 generated by the current detection circuit 5 is supplied to an non-inverting input terminal (+) of the error amplifier EA1.

A combination of the power conversion circuit 3, the control circuit 4 and the detection circuit 5 serves as a switching-type constant current power supply device. A capacitor CO connected between the input terminal 1 and the ground is an input-filtering capacitor.

The operation of the switching-type constant current power supply device in FIG. 1 will be briefly described. The switching transistor Q1 in the power conversion circuit 3 is turned on and off in accordance with a signal supplied from the control circuit 4 (this ON/OFF operation is performed at a frequency of about several hundred kHz). In conjunction with the ON/OFF operation of the switching transistor Q1, a current flows into the smoothing capacitor C1 through the choke coil L1 and the rectifier diode D1. Thus, the smoothing capacitor C1 is charged at a voltage greater than an input voltage supplied to the input terminal 1, and a current IL proportional to the interterminal voltage of the capacitor C1 flows through the load 6 and the current detection circuit 5.

Then, a feedback signal F1 proportional to a load current IL is generated by the current detection circuit 5, and fed back to the control circuit 4.

The level of the feedback signal F1 to be provided from the current detection circuit 5 to the control circuit 4 has an magnitude proportional to an input current (=load current IL) instead of an magnitude proportional to an output voltage as in a typical switching-type power supply device. Thus, the control circuit 4 generates a pulsed signal having an ON-duty ratio proportional to the feedback signal F1 (=load current IL), according to a control logic configured by the error amplifier EA1, the reference voltage source VR and others, and supplies the pulsed signal to the switching transistor Q1. Then, the switching transistor Q1 is tuned on and off at the ON-duty ratio proportional to the load current IL. For example, if the load current IL is lower than a target stabilization value, the switching transistor Q1 is operated to increase the interterminal voltage of the smoothing capacitor C1 so as to lead the load current IL to be increased. Based on the above operation, the power supply device in FIG. 1 stabilizes the load current IL.

Recent electronic apparatuses are equipped with various sizes and types of display units and/or lighting units, and a light-emitting diode (hereinafter referred to as "LED") is used in most of such display units and lighting units, as a light source thereof. In case where the LED is used as a light source, its characteristics, such as light intensity and brightness, can be maintained constant only if a supply current for the LED is maintained at a constant value. In order to supply a stable current to the LED, a part of recent electronic apparatus are provided with the switching-type constant current power supply device configured as shown in FIG. 1, which is associated with a display unit and/or a lighting unit thereof. Such a combination of the LED and the power supply device is disclosed in Japanese Patent Laid-Open Publication Nos. 11-068161, 2001-215913 and 2002-203988.

A part of recent display units or lighting units using the LED as its light source are designed such that the LED is repeatedly turned on and off at a speed unrecognizable to human eyes (specifically at several hundred Hz) to perform a lighting control. Such display units or lighting units inevitably have one period where a certain current flows through the LED (hereinafter referred to as "current flow period"), and another period where no current flows through the LED (hereinafter referred to as "current cut-off period"). Thus, if a power supply for supplying a current to the LED is the switching-type constant current power supply device as shown in FIG. 1, the feedback signal F1 to be supplied from the current detection circuit 5 to the control circuit 4 during the current cut-off period will have an approximately zero level.

The control circuit 4 supplied with such a feedback signal F1 acts to set a duty ratio of the ON/OFF operation of the switching transistor Q1 at a maximum value during a current cut-off period, and then set the duty ratio at a value proportional to a target current during the subsequent current flow period. In this operation, when the duty ratio is maximized during the current cut-off period, the interterminal voltage of the smoothing capacitor C1 is sharply increased up to an excessively high value. Then, during the subsequent current flow period, a load current equal to or greater than the target stabilization value flows for a relatively long time of period. That is, a phenomenon of destabilization in load current occurs in the switching-type constant current power supply device.

It is easily conceivable that such a load-current destabilization phenomenon can be prevented if the feedback signal F1 is smoothed using a capacitor with a large capacitance before it is supplied to the control circuit 4. However, in the switching-type constant current power supply device provided with a capacitor having a capacitance capable of maintaining the supply signal for the control circuit at a significant value over the entire current cut-off period, a processed signal from the control circuit 4 is meant to be an average value of the feedback signal in a relatively long time of period. Thus, if some fluctuation or change of the load current IL is caused by a periodic ON/OFF or interruption of a load (LED) or another non-interruption factor, it will not be able to quickly recover the load current IL deviated from the target stabilization value. In consequence, the load-current destabilization phenomenon will be caused by a factor other than the current cut-off period.

As above, in case where the power supply device configured as shown in FIG. 1 is used under the condition that a load is tuned on and off, a response speed of the feedback loop tracking a path consisting of the control circuit 4, the switching transistor Q1, the smoothing capacitor C1, the load 6 and the current detection circuit 5 is likely to have difficulties in following the change of the load and to result in precluding the power supply device from stabilizing the load current IL.

SUMMARY OF THE INVENTION

In view of the above circumstances, it is therefore an object of the present invention to provide a switching-type constant current power supply device capable of stabilizing a load current even under the condition that a load is repeatedly turned on and off.

In order to achieve this object, the present invention provides a switching-type constant current power supply device including a switching-type power conversion circuit for supplying a given current to a load connected to the output side thereof, a current detection circuit connected to the load and adapted to generate a first feedback signal proportional to a load current, and a control circuit connected to the power conversion circuit and the current detection circuit and adapted, in response to receiving the first feedback signal, to stabilize the load current. The switching-type constant current power supply device comprising a voltage detection circuit connected to the output side of the power conversion circuit and adapted to generate a second feedback signal proportional to an output voltage of the power conversion circuit, a feedback circuit connected to the current detection circuit, the voltage detection circuit and the control circuit and adapted to supply either one of the first and second feedback signals to the control circuit, and an alteration circuit connected to a given position of a comprehensive circuit block consisting of the voltage detection circuit, the control circuit and the feedback circuit which are connected with each other, and adapted, in response to the change in the load, to alter a relative magnitude relationship between a reference voltage and the second feedback signal which are to be entered into a common error amplifier in the control circuit.

In a first preferred embodiment of the present invention, the switching-type constant current power supply device is configured as follows.

The switching-type constant current power supply device is fundamentally composed of the power conversion circuit for supplying a stable current to a load, the control circuit for driving the power conversion circuit, and the current detection circuit for generating a first feedback signal proportional to a load current. Further, the voltage detection circuit for generating a second feedback signal proportional to an output voltage of the power conversion circuit is connected to the output side of the power conversion circuit, and the feedback circuit for supplying either one of the feedback signals is connected between the current detection circuit, the voltage detection circuit and the control circuit. Furthermore, the alteration circuit is designed to alter the level of the second feedback signal in response to the change in the load, and connected to a given position of the voltage detection circuit.

The alteration circuit may be comprised of a resistor connected between the voltage detection circuit and the ground, and a switch connected in parallel to the resistor and adapted to be switched in accordance with the state of the load. The feedback circuit may include a pair of amplifiers adapted to receive the first and second feedback signals, respectively, and supply one of the feedback signals which has a larger signal level.

In the switching-type constant current power supply device according to the first preferred embodiment of the present invention, when the load current is flowing (during the current flow period), the alteration circuit is operable to allow the second feedback signal to have a relatively low signal level. Specifically, the signal level of the second feedback signal is altered to be lower than that of a reference voltage to be supplied to a common error amplifier in the control circuit. In other words, the signal level of the second feedback signal is altered to be lower than that of the first feedback signal to be generated when a load current is stably flowing. Thus, in such a state, the first feedback signal is supplied to the control circuit, so that the switching-type constant current power supply device is operable to supply a stable load current at a given magnitude.

Otherwise, when the load current is not flowing (during the current cut-off period), the alteration circuit is operable to allow the second feedback signal to have a relatively high signal level. Specifically, the signal level of the second feedback signal is altered to be higher than that of the reference voltage. Thus, in such a state, the second feedback signal is supplied to the control circuit, so that the control circuit supplied with the feedback signal having a higher signal level than the reference voltage is operable to discontinue the ON/OFF operation of a switching transistor in the power conversion circuit. Instead of discontinuing the ON/OFF operation of the switching transistor, the control circuit may be configured to allow the switching transistor to have an extremely reduced ON period of time.

In a second preferred embodiment, the switching-type constant current power supply device includes one rectifying/smoothing circuit for supplying the load current to the load (first rectifying/smoothing circuit), a second rectifying/smoothing circuit different connected to the voltage detection circuit. Further, the alteration circuit is connected to the voltage detection circuit. Except for the above configuration, the switching-type constant current power supply device according to the second preferred embodiment has approximately the same configuration as that in the first preferred embodiment.

Generally, when the current cut-off period is shifted to the current flow period, the output voltage of the first rectifying/smoothing circuit is largely varied due to a large current instantaneously flowing through the load. By contrast, a rectifier diode provided in the second rectifying/smoothing circuit prevents the output voltage of the second rectifying/ smoothing circuit from being largely reduced as in the output voltage of the first rectifying/smoothing circuit.

Based on the function of the second rectifying/smoothing circuit, the switching-type constant current power supply device according to the second preferred embodiment prevents noises likely to cause instability in operation from intruding into the feedback circuit and/or the control circuit through the voltage detection circuit.

In a third preferred embodiment, the switching-type constant current power supply device has approximately the same configuration as that in the first embodiment, except for the connecting position of the alteration circuit. Specifically, the alteration circuit in the third preferred embodiment is connected to a given position of the control circuit in such a manner that the magnitude of a reference voltage to be entered into an error amplifier used in common with the second feedback signal is altered in accordance with the state of the load. The alteration circuit may comprise a plurality of resistors connected in series between a reference voltage source provided in the control circuit and the ground, and a switch which is connected in parallel to one of the plurality of resistors and adapted to be switched in accordance with the state of the load.

In the switching-type constant current power supply device according to the third preferred embodiment, the alteration circuit is operable to set the reference voltage entered into the error amplifier, at a specific predetermined value (hereinafter referred to as "predetermined value"). More specifically, the predetermined value means a voltage value for stabilizing the load current at a value equal to a target stabilization value.

The signal level of the second feedback signal is preset to be lower than that of the first feedback signal to be generated when a load current is stably flowing. Thus, during the current flow period, the feedback circuit supplies the first feedback signal to the control circuit. In this case, the control circuit drives the power conversion circuit to stabilize the load current in the same manner as that in the conventional circuit, because a signal to be subjected to a processing using an internal control logic thereof is the reference voltage with the predetermined value and the first feedback signal.

Otherwise, during the current cut-off period, the alteration circuit is operable to set the reference voltage to be entered into the error amplifier, at a value lower than the predetermined value. Specifically, the reference voltage is altered to have a value lower than that of the second feedback signal to be supplied to the common error amplifier in the control circuit. During the current cut-off period, the feedback circuit supplies the second feedback signal to the control circuit, because the first feedback signal becomes approximately zero during this period. Then, the control circuit discontinues the ON/OFF operation of the switching transistor in the power conversion circuit, because a signal to be subjected to a processing using an internal control logic thereof is the second feedback signal and the reference voltage lower than the second feedback signal. Instead of discontinuing the ON/OFF operation of the switching transistor, the control circuit may be configured to allow the switching transistor to have an extremely reduced ON period of time.

Based on the above operation, when the load is turned on and off, the switching-type constant current power supply device according to the first or second preferred embodiment of the present invention can prevent the interterminal voltage of a smoothing capacitor from excessively increasing during the current cut-off period.

Other features and advantages of the present invention will be apparent from the accompanying drawings and from the detailed description

DESCRIPTION OF THE PREFERRED EMBODIMENTS

Figure 2:
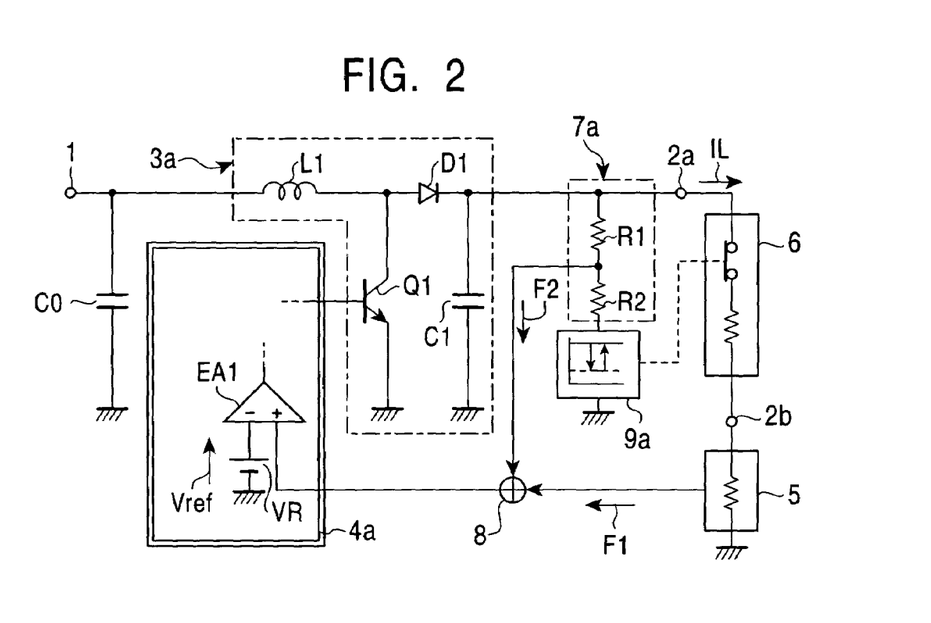
FIG. 2 is a circuit diagram of a switching-type constant current power supply device according to a first embodiment of the present invention.

With reference to the drawings, various embodiments of the present invention will now be described. FIG. 2 is a circuit diagram of a switching-type constant current power supply device according to a first embodiment of the present invention. The switching-type constant current power supply device in FIG. 2 comprises a voltage detection circuit 7a and an alteration circuit 9a, which are connected in series with one another between an output terminal 2a and the ground, and a feedback circuit 8 connected between an current detection circuit 5, the voltage detection circuit 7a and a control circuit 4a. The voltage detection circuit 7a is composed of a series circuit of resistors R1 and R2 as with that used in conventional commonly used switching-type power supply devices. Except for the above point, the circuit in FIG. 2 has approximately the same configuration as that of the conventional circuit illustrated in FIG. 1.

The alteration circuit 9a in FIG. 2 is operable to alter the level of a feedback signal F2 output from the voltage detection circuit 7a, in accordance with the state of a load 6 (that is, the state of the flow of a load current IL, or the state of ON/OFF of an LED). The alteration of the level of the feedback signal F2 specifically means that the feedback signal F2 is altered to have a level less or greater than that of a reference voltage Vref which is to be supplied to an error amplifier EA1 in the control circuit 4a.

The feedback circuit 8 in FIG. 2 is operable, in response to receiving a first feedback signal F1 supplied from the current detection circuit 5 and the second feedback signal F2 supplied from the voltage detection circuit 7a, to supply one of the first and second feedback signals F1, F2, which has a higher signal level, to the control circuit 4a.

The switching-type constant current power supply device having the above configuration is operated as follows.

Figure 3:
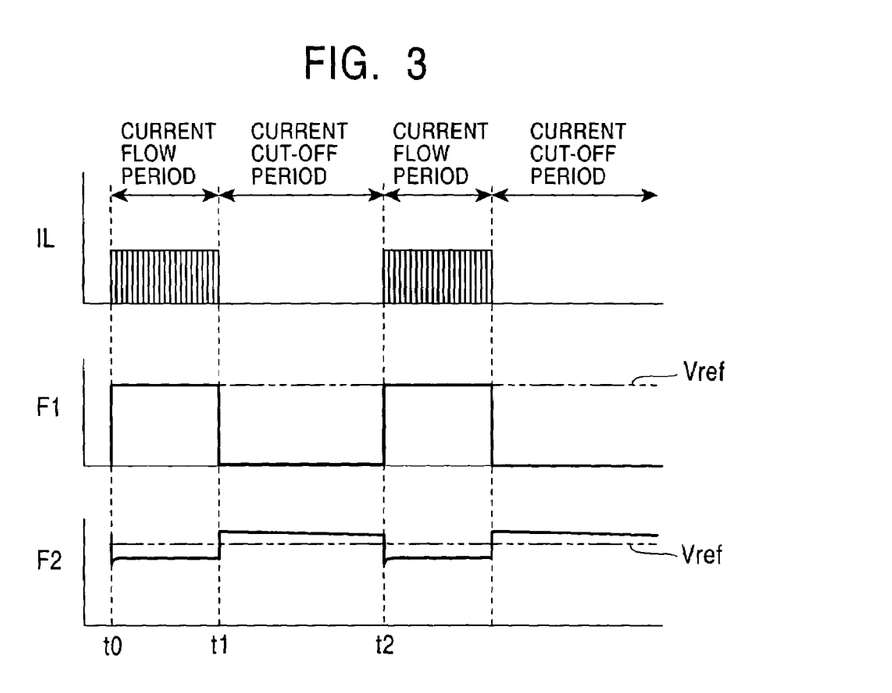
FIG. 3 is a timing chart of current and voltage to be generated in the circuit in FIG. 2.

For example, when a load current IL equal to a target stabilization value is flowing through the load 6, the first feedback signal F1 output from the current detection circuit 5 has a value approximately equal to the reference voltage Vref. Simultaneously, according to the operation of the alteration circuit 9a, the second feedback signal F2 output from the voltage detection circuit 7a has a value less than the reference voltage Vref. Thus, during a current flow period, the feedback circuit 8 supplies the first feedback signal F1 generated from the current detection circuit 5, to the control circuit 4a. The term "current flow period" means a period in which the load current is flowing, specifically a period between Time t0 and Time t1 in FIG. 3. When the feedback signal F1 is being supplied to the control circuit 4a, the circuit in FIG. 2 is operated in the same manner as that of the conventional circuit in FIG. 1, to allow the load current IL to have a magnitude equal to the target stabilization value.

When the load current IL flowing through the load 6 is cut off at predetermined Time t1, the first feedback signal F1 output from the current detection circuit 5 becomes approximately zero. Simultaneously, according to the operation of the alteration circuit 9a, the second feedback signal F2 output from the voltage detection circuit 7a has a value greater than the reference voltage Vref. Thus, during a current cut-off period, the feedback circuit 8 supplies the second feedback signal F2 from the voltage detection circuit 7a, to the control circuit 4a. The term "current cut-off period" means a period in which the load current is not flowing, specifically a period between Time t1 and Time t2 in FIG. 3.

In response to receiving the second feedback signal F2 greater than the reference voltage Vref, the control circuit 4a discontinues the ON/OFF operation of a switching transistor Q1 in a power conversion circuit 3a. When the ON/OFF operation of the switching transistor Q1 is discontinued, the interterminal voltage of a smoothing capacitor C1 is not increased during the current cut-off period. Thus, in the initial stage of the subsequent current flow period, the load current IL cannot have a value equal to or greater than the target stabilization value. In this manner, the switching-type constant current power supply device in FIG. 2 can stabilize the load current even under the condition that the load is repeatedly turned on and off.

In the circuit configuration illustrated in FIG. 2, due to a minute current continuously flowing into the voltage detection circuit 7a, if the ON/OFF operation of the switching transistor Q1 is completely stopped, the interterminal voltage of the smoothing capacitor C1 will be gradually reduced. Thus, the load current IL generated immediately after Time t2, or immediately after one current cut-off period is sifted to the subsequent current flow period, has a value slightly less than the target stabilization value. However, when the operation of the control circuit 4a and the power conversion circuit 3a are restarted, the load current is quickly returned to a value equal to the target stabilization value.

If the current cut-off period is extended due to occurrence of some accident, the interterminal voltage of the smoothing capacitor C1 will be significantly reduced. However, when the second feedback signal F2 becomes equal to or less than the reference voltage Vref, the control circuit 4a and the power conversion circuit 3a is restarted to allow the interterminal voltage of the smoothing capacitor C1 to be maintained at a given minimum value. In this manner, the switching-type constant current power supply device having the circuit configuration in FIG. 2 can prevent the load current IL not only from flowing at a value greater than the target stabilization value, but also from being excessively reduced immediately after the initiation of the current flow period.

Figure 4A:
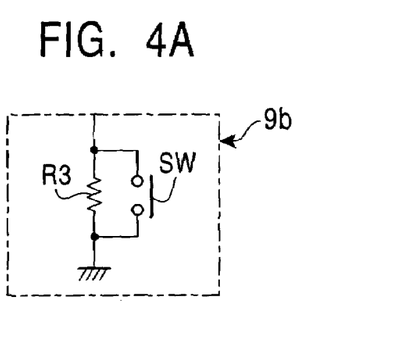
FIGS. 4(A) and 4(B) are circuit diagrams showing examples of a specific configuration of an alteration circuit illustrated in FIG. 2.
Figure 4B:
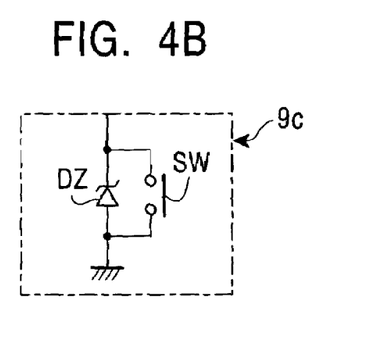

The alteration circuit 9a in FIG. 2 is required to have a function of allowing the second feedback signal to be less than the reference voltage Vref when the load current IL is flowing and to be greater than the reference voltage Vref when the load current IL is not flowing. FIGS. 4(A) and 4(B) show two examples of a specific configuration for achieving the alteration circuit 9a having such a function. An alteration circuit 9d illustrated in FIG. 4(A) comprises a parallel circuit of a resistor R3 and a switch SW, and an alteration circuit 9c illustrated in FIG. 4(B) comprises a parallel circuit of a constant voltage diode DZ and a switch SW.

The switch SW of the circuit in FIG. 4(A) is closed when the load current IL is flowing. In this state, the resistor R3 is short-circuited, and thereby the second feedback signal F2 has a value derived from dividing the output voltage of the power conversion circuit 3a by the resistor R1 and the resistor R2. Otherwise, when the load current IL is not flowing, the switch SW is opened. In this state, the second feedback signal F2 has a value derived from dividing the output voltage of the power conversion circuit 3a by the resistor R1 and (the register R2 and the resistor R3).

More specifically, the signal level of the second feedback signal F2 in the period where the load current IL is not flowing is higher than that in the period where the load current IL is flowing, by a factor of a voltage drop arising between the terminals of the resistor R3. Thus, the value of the output voltage of the power conversion circuit 3a and the respective values of the resistors R1, R2, R3 can be appropriately set up to achieve the aforementioned function required for the alteration circuit 9a. While the alteration circuit 9a of the circuit in FIG. 2 is connected between the voltage detection circuit 7a and the ground, the alteration circuit 9a may be connected between the voltage detection circuit 7a and the output terminal 2a. In this case, it is required to design the switch SW such that it is appropriately switched in accordance with the state of the load current.

The circuit in FIG. 4(b) utilizes a zener voltage of a constant voltage diode DZ instead of the voltage drop arising between the terminals of the resistor R3. The operation and function of the circuit in FIG. 4(b) is substantially the same as those of the circuit in FIG. 4(A).

The function of the constant voltage diode DZ of the circuit in FIG. 4(B) is equivalent to a level shift circuit. Thus, the alteration circuit 9c may be configured using the level shift circuit. The alteration circuit 9c using the level shift circuit is not required to be connected in series to the voltage detection circuit 7a between the output terminal 2a and the ground. Specifically, the alteration circuit 9c may be connected between the voltage detection circuit 7a and the feedback circuit 8.

Figure 5:
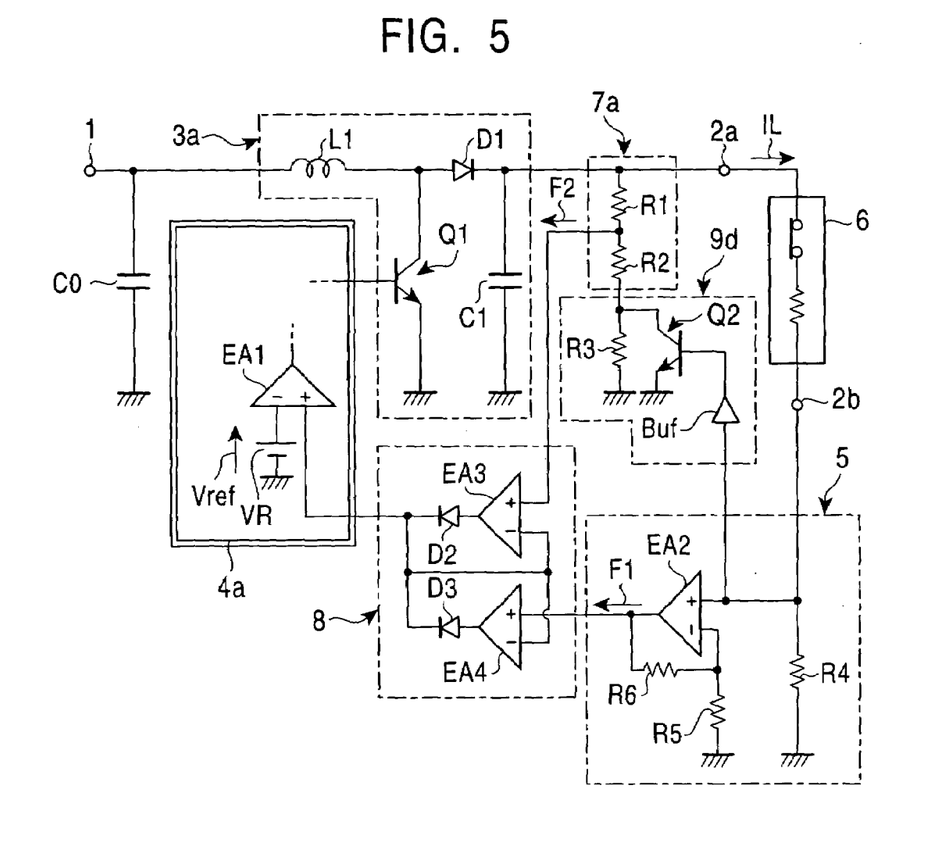
FIG. 5 is a circuit diagram of a switching-type constant current power supply device according to a second embodiment of the present invention.

FIG. 5 is a circuit diagram of a switching-type constant current power supply device according to a second embodiment of the present invention. This switching-type constant current power supply device has the following circuit configuration.

A power conversion circuit 3a including a choke coil L1, a switching transistor Q1, a rectifier diode D1 and a smoothing capacitor C1 which are connected with each other to form a step-up chopper converter is connected between an input terminal 1 and one 2a of a pair of output terminals. A load 6 to be repeatedly turned on and off is connected between the output terminals 2a, 2b, and a current detection circuit 5 is connected the other output terminal 2a and the ground. In this embodiment, the current detection circuit 5 comprises a resistor R4 connected between the output terminal 2b and the ground, an amplifier EA2 having a non-inverting input terminal (+) connected to one of the terminals of the resistor R4 on the side of the output terminal 2b, a resistor R5 connected between an inverting terminal (−) of the amplifier EA2 and the ground, and a resistor R6 connected between the output terminal and the inverting terminal (−) of the amplifier EA2.

A control circuit 4a is connected to the power conversion circuit 3a to drive the power conversion circuit 3a in accordance with the signal level of a feedback signal supplied to an internal error amplifier EA1 of the control circuit 4a. Three registers R1, R2 and R3 are connected in series between the output terminal 2a and the ground, and a main current path of a transistor Q2 is connected to the resistor R3. The base of the transistor Q2 is connected to the output side of a buffer circuit Buf, and the input side of the buffer circuit Buf is connected to the terminal of the resistor R4 of the current detection circuit 5 on the side of the output terminal 2b. A combination of the resistors R1 and R2 serves as a voltage detection circuit 7a, and a combination of the resistor R3, the transistor Q2 and the buffer circuit Buf serves as an alteration circuit 9b.

The switching-type constant current power supply device also includes an amplifier EA3 having a non-inverting input terminal (+) connected to a common junction between the resistors R1 and R2, and an amplifier EA4 having a non-inverting input terminal (+) connected to the output terminal of the amplifier EA2. The output terminal of the amplifier EA3 is connected to the anode of an anti-reverse-flow diode D2, and output terminal of the amplifier EA4 is connected to the anode of an anti-reverse-flow diode D3. The cathodes of the diodes D2 and D3 are connected to a common junction. The common junction of the diodes D2 and D3 is connected to each of inversing input terminals (−) of the amplifiers EA3 and EA4. The common junction of the diodes D2 and D3 is also connected to the control circuit 4a, specifically to a non-inverting input terminal (+) of the error amplifier EA1 provided in the control circuit 4a. A combination of the amplifiers EA3, EA4 and the diodes D2, D3 serves as a feedback circuit 8.

In the above circuit illustrated in FIG. 5, when a load current IL is flowing through the load 6, a given voltage is generated between the terminals of the resistor R4 in the current detection circuit 5. This voltage is amplified at an appropriate signal level through the amplifier EA2, and then supplied to the feedback circuit 8 as a first feedback signal F1.

The interterminal voltage of the resistor R4 is also supplied to the alteration circuit 9b and the buffer circuit Buf. In response to receiving the interterminal voltage, the buffer circuit Buf turns on the transistor Q2. Thus, the transistor Q2 acts to short-circuit between the terminals of the resistor R3, and a voltage appearing at the common junction between the resistors R1 and R2 becomes equal to a value derived from dividing the output voltage of the power conversion circuit 3a by the resistors R1 and R2. This voltage appearing at the common junction between the resistors R1 and R2 is supplied to the feedback circuit 8 as a second feedback signal F2. This second feedback signal F2 has a value slightly less than a reference voltage Vref output from a reference voltage source VR in the control circuit 4a.

The feedback circuit 8 has a circuit configuration in which a common signal is entered into the respective inversing input terminals (−) of the amplifier EA3 and the amplifier EA 4 in a feedback manner. Thus, among the second feedback signal F2 supplied to the amplifier EA3 and the first feedback signal F1 supplied to the amplifier EA 4, the feedback circuit 8 supplies one having a higher signal level to the control circuit 4a. When the load current IL is approximately equal to the target stabilization value, the first feedback signal F1 becomes approximately equal to the reference voltage Vref in the control circuit 4a. In contrast, according to the function of the alteration circuit 9b, the second feedback signal F2 has a value slightly less than the reference voltage Vref. Thus, when the load current IL is flowing through the load 6, the first feedback signal F1 is supplied to the control circuit 4a.

In response to receiving the first feedback signal F1, the control circuit 4a supplies a signal for switching the switching transistor Q1 at an ON-duty ration proportional to the signal level of the first feedback signal, to the switching transistor Q1 according to a control logic configured therein. In this manner, the load current IL is led to have a value equal to the target stabilization value, and stabilized.

When the load current IL is cut off after it flows through the load 6 for a given time, the voltage to be generated between the terminals of the resistor R4 becomes approximately zero. Thus, the signal level of the first feedback signal F1 to be output from the amplifier EA2 also becomes approximately zero.

In response to the approximately zero interterminal voltage of the resistor R4, the buffer circuit Buf turns off the transistor Q2. Thus, the voltage appearing at the common junction between the resistors R1 and R2 has a value derived from dividing the output voltage of the power conversion circuit 3a by the resistor R1 and the combined resistor (R2+R3). That is, this voltage appearing at the common junction between the resistors R1 and R2 is increased by the voltage drop arising between the terminals of the resistor R3. Consequently, the signal level of the second feedback signal F2 has a value slightly greater than the reference voltage Vref in the control circuit 4a.

When the load current IL is cut off, the feedback circuit 8 supplies the second feedback signal F2 to the control circuit 4a, because it is configured to supply one of the feedback signals which has a higher signal level, to the control circuit 4a, as described above.

The second feedback signal having a signal level slightly greater than the reference voltage Vref allows the control circuit 4a to discontinue the ON/OFF operation of the switching transistor Q1. This prevents the interterminal voltage of the smoothing capacitor C1 from increasing during the current cut-off period, so as to prevent the load current IL from flowing at a value greater than the target stabilization value in the initial stage of the subsequent current flow period.

As is well known, an LED has capacitive impedance. Thus, in a load 6 including a number of LEDs, a large current (or inrush current) instantaneously flows therethrough when the current cut-off period is shifted to the current flow period, and the interterminal voltage of the smoothing capacitor C1 is largely changed. As a result, noises are superimposed on the second feedback signal F2 to be output from the voltage detection circuit 7, which is likely to cause improper operations in the feedback circuit 8 and/or the control circuit 4a. Therefore, in case where the load 6 includes a number of LEDs, it is desired to use an element having a high capacitance as the smoothing capacitor C1 in the circuit in FIG. 1 or FIG. 5 so as to reduce noises at a low level.

Figure 6:
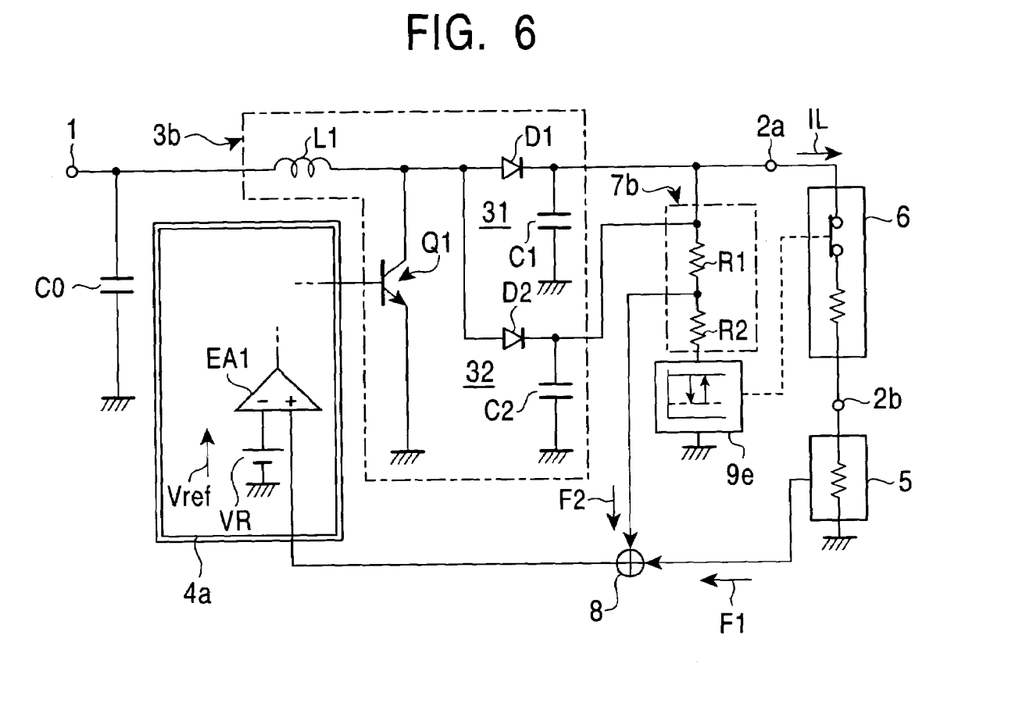
FIG. 6 is a circuit diagram of a switching-type constant current power supply device according to a third embodiment of the present invention.

FIG. 6 is a circuit diagram of a switching-type constant current power supply device according to a third embodiment of the present invention. The circuit in FIG. 6 has the following circuit configuration to prevent improper operations due to noises.

In addition to a first rectifying/smoothing circuit 31 composed of a rectifier diode D1 and a smoothing capacitor C1, a power conversion circuit 3b includes a second rectifying/smoothing circuit 32 composed of a rectifier diode D2 and a smoothing capacitor C2. A voltage detection circuit 7b and an alteration circuit 9e are connected to the second rectifying/smoothing circuit 32 capable of generating an output voltage approximately in conjunction with the output voltage of the first rectifying/smoothing circuit 31. Except for this point, the circuit in FIG. 6 has the same configuration as that of the circuit in FIG. 2.

The circuit in FIG. 6, which comprises in combination the rectifying/smoothing circuit 31 for supplying current to a load 6 and the rectifying/smoothing circuit 32 for supplying voltage to the voltage detection circuit 7b, has rectifier diodes D1 and D2 interposed therein to prevent any charge/discharge between the smoothing capacitors C1 and C2. Thus, even if a large current instantaneously flows when the current cut-off period is shifted to the current flow period, and the interterminal voltage of the smoothing capacitor C1 is largely changed, the interterminal voltage of the smoothing capacitor C2 will not be adversely affected thereby. This prevents noises having a large amplitude from being superimposed on a second feedback signal F2 to be output from the voltage detection circuit 7b, so as to avoid improper operations in the feedback circuit 8 and/or the control circuit 4a due to noises.

Figure 7:
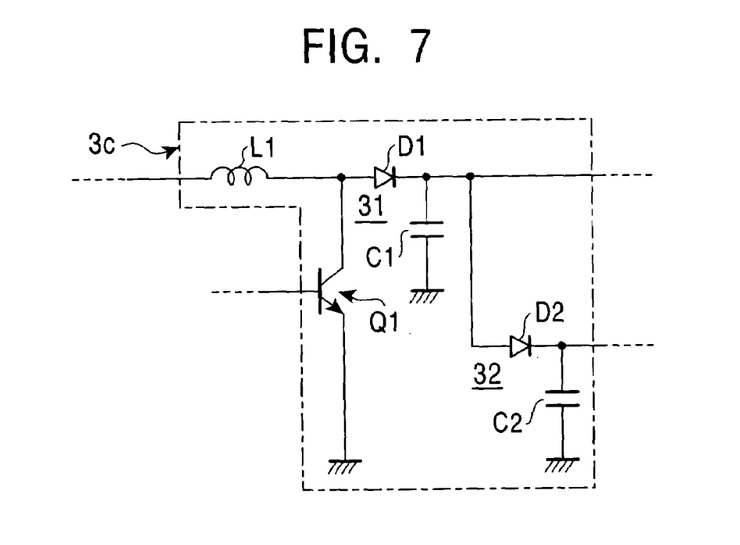
FIG. 7 is a circuit diagram of one modification of a power conversion circuit illustrated in FIG. 6.

The first and second rectifying/smoothing circuits 31, 32 in FIG. 6 are disposed in parallel on the output side of the choke coil L1. As long as the first and second rectifying/smoothing circuits can provide respective output voltages approximately in conjunction with one another, they may be disposed in series on the output side of the choke coil L1, as shown in FIG. 7.

Figure 8:
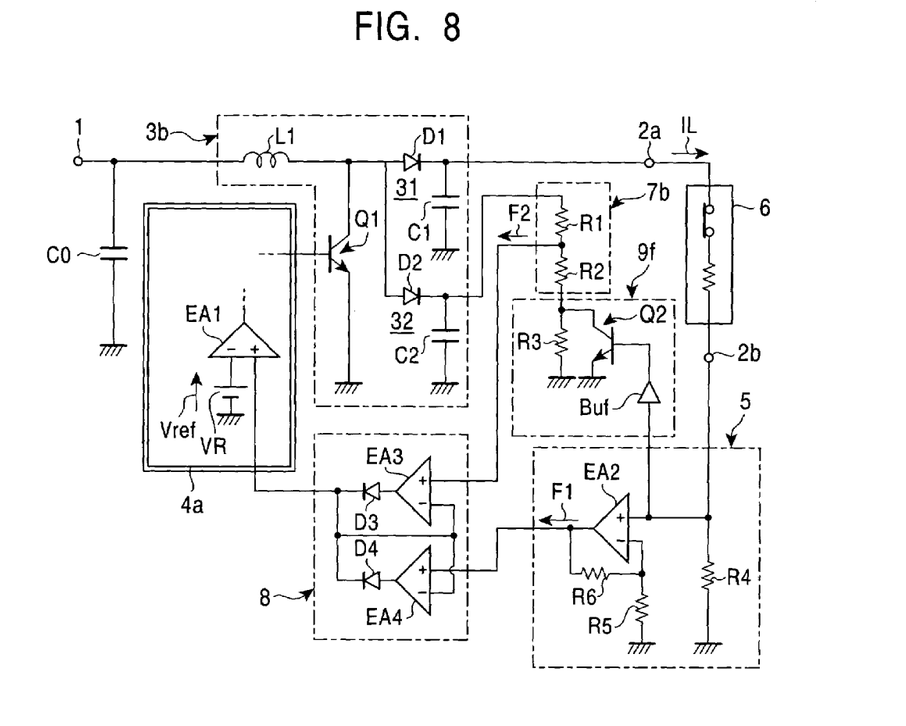
FIG. 8 is a circuit diagram of a switching-type constant current power supply device according to a fourth embodiment of the present invention.

FIG. 8 is a circuit diagram of a switching-type constant current power supply device according to a fourth embodiment of the present invention. The power conversion circuit 3b in FIG. 8 has the same circuit configuration as that of the power conversion circuit 3b in FIG. 6. The remaining configuration other than the power conversion circuit 3b is approximately the same as that of the circuit in FIG. 5. The general operation of the switching-type constant current power supply device in FIG. 8 is the same as that of the circuit in FIG. 6, and the respective detailed operations of a current detection circuit 5, a voltage detection circuit 7b, a alteration circuit 9f, a feedback circuit 8 and a control circuit 4a, which constitute this device are the same as those in FIG. 5. Thus, the description on the operation of the circuit in FIG. 8 will be omitted.

Figure 9:
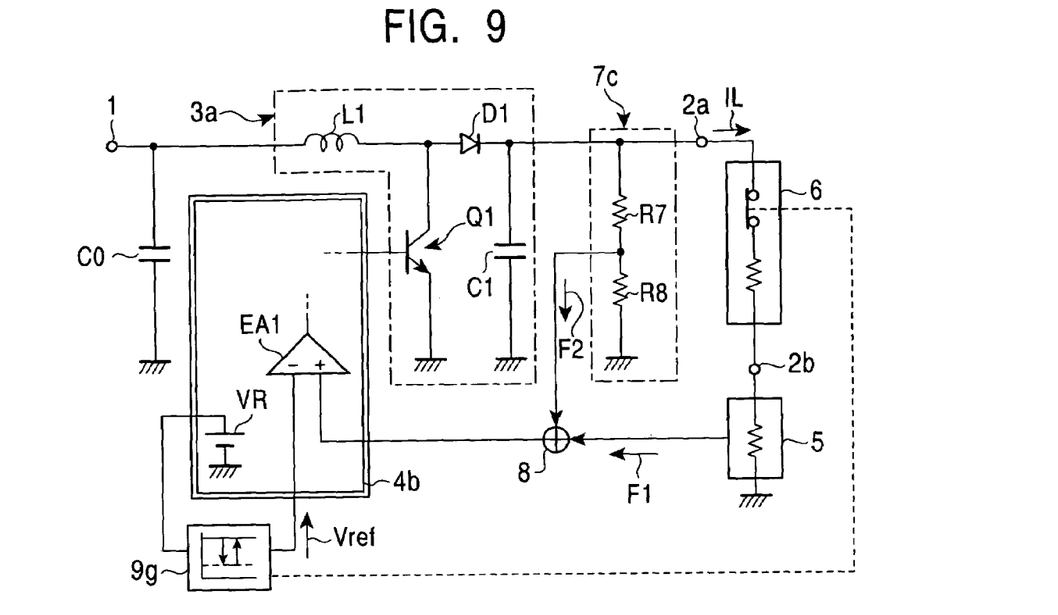
FIG. 9 is a circuit diagram of a switching-type constant current power supply device according to a fifth embodiment of the present invention.

FIG. 9 is a circuit diagram of a switching-type constant current power supply device according to a fifth embodiment of the present invention.

The circuit in FIG. 9 includes a voltage detection circuit 7c connected between an output terminal 2a and the ground, and a feedback circuit 8 connected between a current detection circuit 5, the voltage detection circuit 7c and a control circuit 4b. The voltage detection circuit 7c is comprised of a series circuit of two resistors R1 and R2. Further, an alteration circuit 9g is connected to a given position of the control circuit. Specifically, the alteration circuit 9g is connected between a reference voltage source VR incorporated in the control circuit 4b, and an inverting input terminal (−) of an error amplifier EA1. Except for these points, the circuit in FIG. 9 has approximately the same configuration as that of the conventional circuit in FIG. 1.

The alteration circuit 9g is operable to alter the magnitude of a reference voltage Vref to be supplied from the reference voltage source VR to an error amplifier EA1 in accordance with the state of a load 6 (that is, the state of the flow of a load current IL or the state of ON/OFF of an LED). The alteration in the magnitude of the reference voltage Vref means that the reference voltage Vref is altered to have a specific predetermined value, or a value less than a second feedback signal F2.

The feedback circuit 8 is operable, in response to receiving a first feedback signal supplied from the current detection circuit 5 and the second feedback signal supplied from the voltage detection circuit 7c, to supply one of the first and second feedback signals F1, F2 which has a higher signal level, to the control circuit 4b.

Most of commercially available control ICs has a configuration having an error amplifier (EA1) and a reference voltage source (VR) connected together through an internal connection in advance. However, the control circuit 4b in FIG. 9 is designed based on a control IC of a type in which a reference voltage source in the IC and an error amplifier are connected together through an external connection. For example, MB 3778 (available from Fujitsu Ltd.) is known as a control IC of a type in which a reference voltage source in the IC and an error amplifier are connected together through an external connection.

The switching-type constant current power supply device in FIG. 2 is designed to allow the control circuit 4a to discontinue the drive of the power conversion circuit 3a so as to prevent the output voltage of the power conversion circuit 3a from increasing during the current cut-off period. In the first embodiment, the operation of the control circuit 4a for discontinuing the drive of the power conversion circuit 3a is achieved by altering the signal level of the second feedback signal F2 using the alteration circuit 9a to have a value less than the reference voltage Vref during the current cut-off period.

By contrast, the switching-type constant current power supply device in FIG. 9 is designed to allow the control circuit 4a to discontinue the drive of the power conversion circuit 3a in a process opposite to that of the device in FIG. 2. Specifically, the operation of the control circuit 4a for discontinuing the drive of the power conversion circuit 3a is achieved by altering the reference voltage Vref using the alteration circuit 9g to have a magnitude greater than that of the second feedback signal F2 during the current cut-off period.

The switching-type constant current power supply device having the circuit configuration as shown in FIG. 9 is operated as follows.

When the load current IL is flowing through the load 6, the alteration circuit 9g sets up the reference voltage Vref to be supplied from the reference voltage source VR to the error amplifier EA1, at a predetermined level. If the lead current IL has a value equal to the target stabilization value, the first feedback signal F1 output from the current detection circuit 5 will be equal to the reference voltage Vref set at the predetermined value. In contrast, the second feedback signal F2 output from voltage detection circuit 7 will be less than the first feedback signal F1 and the reference voltage Vref.

Figure 10:
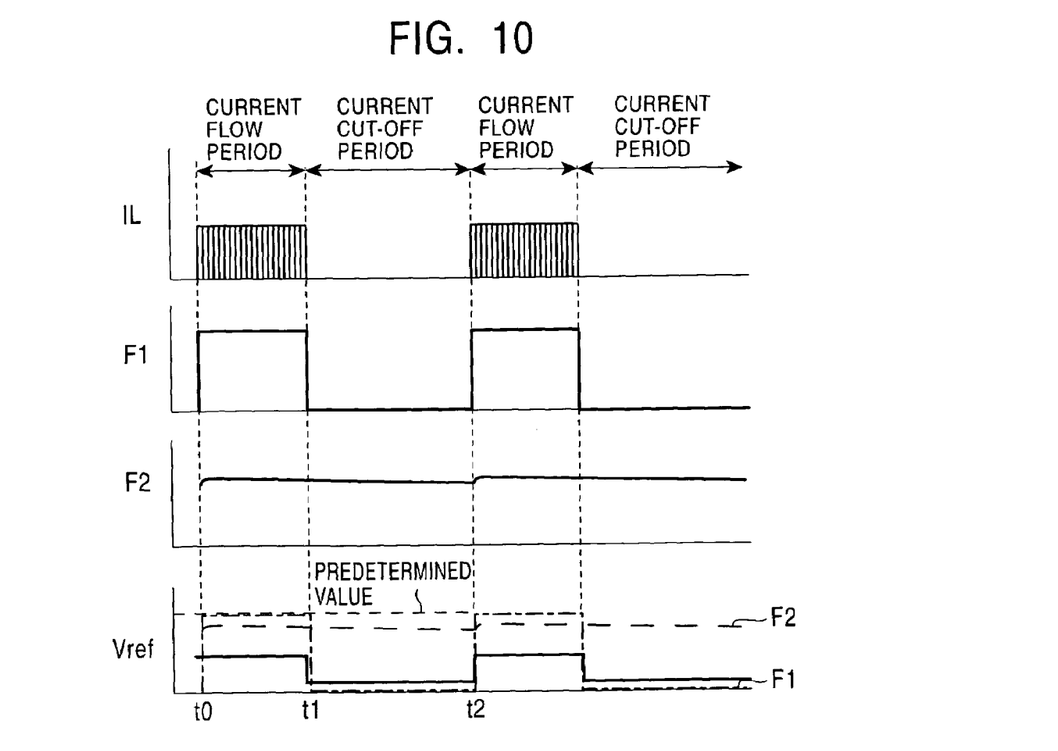
FIG. 10 is a timing chart of current and voltage to be generated in the circuit in FIG. 9.

During the current flow period, the feedback circuit 8 supplies the first feedback signal output from the current detection circuit 5 to the control circuit 4b. The current flow period means a period in which the load current is flowing, specifically a period between Time t0 and Time t1 in FIG. 10. When the reference voltage Vref set at the predetermined value and the first feedback signal F1 are supplied to the error amplifier EA1, the circuit in FIG. 9 is operated in the same manner as that of the conventional circuit in FIG. 1, to allow the load current IL to have a magnitude equal to the target stabilization value.

When the load current IL is cut off at predetermined Time t1, the first feedback signal F1 output from the current detection circuit 5 becomes approximately zero. Simultaneously, according to electric charge accumulated in the smoothing capacitor C1 in the power conversing circuit 3, the second feedback signal F2 to be output from the voltage detection circuit 7c is maintained at approximately the same signal level as that before Time t1. Thus, during a current cut-off period corresponding to the period between Time t1 and Time t2 in FIG. 10, the feedback circuit 8 supplies the second feedback signal F2 output from the voltage detection circuit 7c, to the control circuit 4b.

In response to cut-off of the flow of the load current IL through the load 6, the alteration circuit 9g alters the reference voltage Vref to be supplied from the reference voltage source VR to the error amplifier EA1, to have a value less than the predetermined value. Given that this reference voltage Vref less than the predetermined value is a value less than the second feedback signal F2, the control circuit 4b acts to discontinue the ON/OFF operation of the switching transistor Q1 in the power conversion circuit 3a. When the ON/OFF operation of the switching transistor Q1 is discontinued, the interterminal voltage of the smoothing capacitor C1 is not increased during the current cut-off period, to prevent the load current IL from flowing at a value greater than the target stabilization value in the subsequent current flow period (on and after Time t2). Thus, the switching-type constant current power supply device in FIG. 9 can stabilize the load current even under the condition that the load is repeatedly tuned on and off.

Figure 11A:
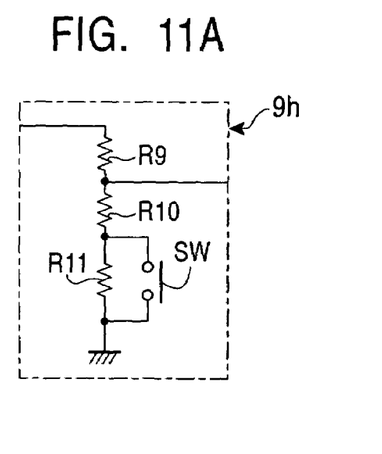
FIGS. 11(A) and 11(B) are circuit diagrams showing examples of a specific configuration of an alteration circuit illustrated in FIG. 9
Figure 11B:
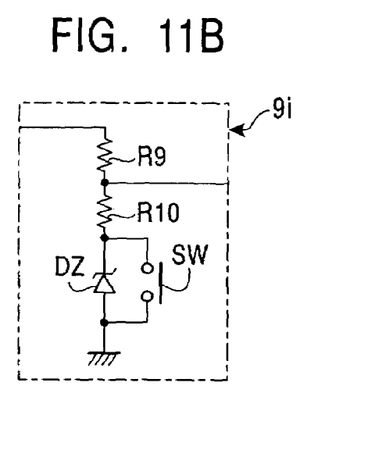

The alteration circuit 9g in FIG. 9 is required to have a function of setting up the reference voltage Vref at a predetermined value when the load current IL is flowing, and altering the reference voltage Vref to have a value less than the second feedback signal F2 when the load current IL is not flowing. FIGS. 11(A) and 11(B) show two examples of a specific configuration for achieving the alteration circuit 9g having such a function.

An alteration circuit 9h illustrated in FIG. 11(A) comprises a series circuit of a plurality of resistors R9, R10, R11 and a switch SW connected in parallel to the resistor R11, and an alteration circuit 9i illustrated in FIG. 11(B) comprises a series circuit of resistors R9, R10 and a constant voltage diode DZ and a switch SW connected in parallel to the constant voltage diode DZ.

The switch SW of the circuit in FIG. 11(A) is closed when the load current IL is not flowing. When the switch SW is closed, the resistor R11 is short-circuited, and thereby the reference voltage Vref to be supplied to the error amplifier EA1 has a value derived from dividing the output voltage of the reference voltage source VR by the resistor R9 and the resistor R10. Otherwise, when the load current is flowing, the switch SW is opened. In this state, the reference voltage Vref has a value derived from dividing the output voltage of the reference voltage source VR by the resistor R9 and the combined resistor (register R10+resistor R11).

More specifically, the reference voltage Vref when the load current IL is flowing is greater than that when the load current IL is not flowing, by a voltage drop arising between the terminals of the resistor R11. Thus, the value of the output voltage of the reference voltage source VR and the respective values of the resistors R9, R10, R11 can be appropriately set up to achieve the aforementioned function required for the alteration circuit 9g. In the circuit in FIG. 11(A), the switch SW may be connected in parallel to the resistor R10 or the resistor R9, to omit the resistor R11. If the switch SW is connected in parallel to the resistor R9, the opening/closing timing of the switch SW will be revered as compared to the case where it is connected in parallel to the resistor R11.

The circuit in FIG. 11(B) utilizes a zener voltage of the constant voltage diode DZ instead of the voltage drop arising between the terminals of the resistor R11. The operation and function of the circuit in FIG. 11(B) is substantially the same as those of the circuit in FIG. 11(A). The function of the constant voltage diode DZ of the circuit in FIG. 11(B) is equivalent to a level shift circuit, and thus the alteration circuit 9i may be configured using the level shift circuit.

Figure 12:
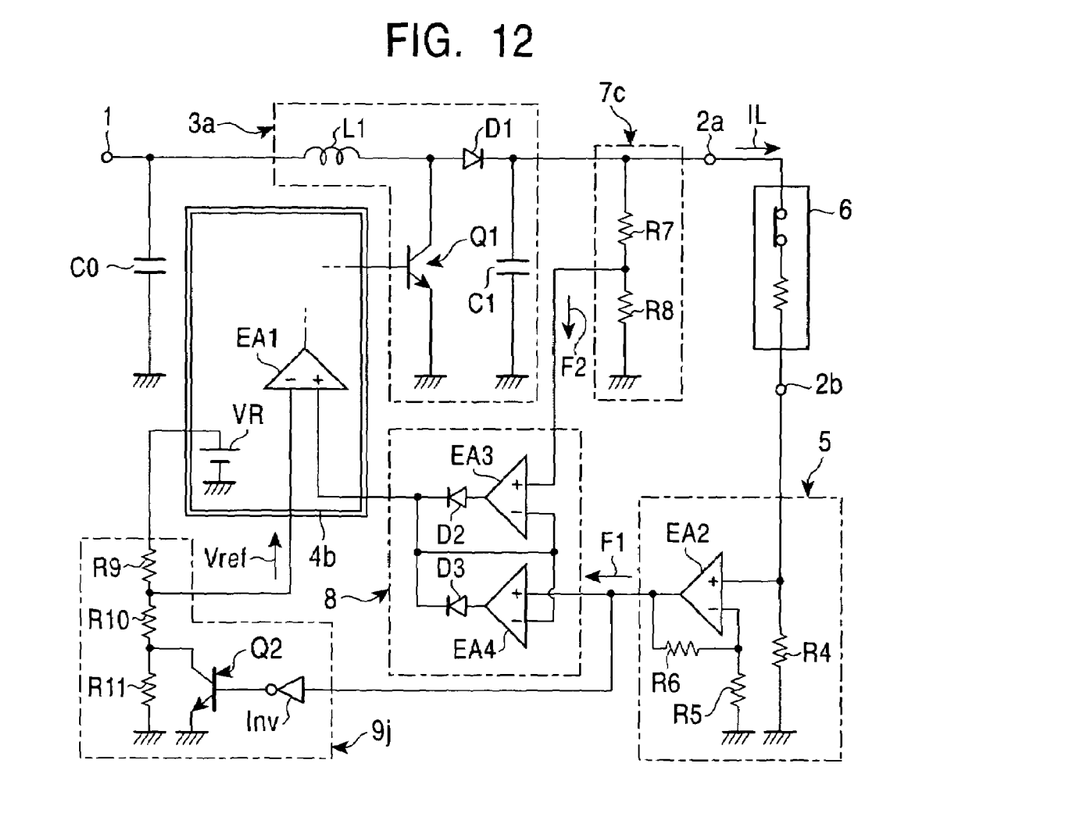
FIG. 12 is a circuit diagram of a switching-type constant current power supply device according to a sixth embodiment of the present invention.

FIG. 12 is a circuit diagram of a switching-type constant current power supply device according to a sixth embodiment of the present invention. This switching-type constant current power supply device has the following circuit configuration.

Three resistors R9, R10 and R11 is connected in series between a reference voltage source VR provided in a control circuit 4b and the ground, and the common junction between the resistors R9 and R10 is connected to an inversing input terminal (−) of an error amplifier EA1. The main current path of a transistor Q2 is connected in parallel to the resistor R5, and the base of the transistor Q2 is connected to the output terminal of an inverter circuit Inv. The input terminal of the inverter circuit Inv is connected to the output terminal of an amplifier EA2. A combination of the resistors R9, R10, R11, the transistor Q2 and the inverter circuit Inv serves as an alteration circuit 9j. Except for these points, the remaining section of the circuit in FIG. 12 is substantially the same as the circuit configuration of the switching-type constant current power supply device in FIG. 9 which incorporates the current detection circuit 5 and the feedback circuit 8 in FIG. 5.

In this circuit configured as above, when a load current IL is flowing through a load 6, a given voltage is generated between the terminals of the resistor 4 in the current detection circuit 5. This voltage is amplified at an appropriate signal level through the amplifier EA2, and then supplied to the feedback circuit 8 as a first feedback signal F1.

When a second feedback signal is supplied to an amplifier EA3, and the first feedback signal is supplied to an amplifier EA4, the feedback circuit 8 is operable to supply one of the first and second feedback signals which has a higher signal level, to the control circuit 8. In this circuit, the circuit elements are designed such that the second feedback signal in a period where the load current IL equal to the target stabilization value is flowing has a value less than that of the first feedback signal F1 in the same period. Thus, when the load current IL is flowing, the first feedback signal F1 is supplied from the feedback circuit 8 to the control circuit 4b. The first feedback signal F1 output from the amplifier EA1 is also supplied to the inverter circuit Inv of the alteration circuit 9j. In response to receiving the first feedback signal having a significant magnitude proportional to the load current IL, the inverter circuit Inv is operable to turn off the transistor Q2. Thus, a reference voltage Vref to be supplied from the alteration circuit 9*j* to the error amplifier EA1 has a value derived from dividing an output voltage of a reference voltage source VR by the resistor 9 and the combined resistor (resistor R10+resistor R11). This reference voltage Vref is used as a predetermined value for allowing the load current IL to have a value equal to the target stabilization value.

According to the above operations of the feedback circuit 8 and the alteration circuit 9*j*, when the load current is flowing, the reference voltage Vref set at the predetermined value and the first feedback signal are supplied to the error amplifier EA1 in the control circuit 4*b*. Then, the control circuit 4*b* supplies a signal for switching a switching transistor Q1 at an ON-duty ratio proportional to the signal level of the first feedback signal F1, to the switching transistor Q1 according to a control ratio configured therein. In this manner, the load current IL is led to have a value equal to the target stabilization value, and stabilized.

When the load current IL is cut off after it flows through the load 6 for a given time, the voltage to be generated between the terminals of the resistor R4 becomes approximately zero. Thus, the signal level of the first feedback signal F1 to be output from the amplifier EA2 also becomes approximately zero. Simultaneously, according to electric charge accumulated in a smoothing capacitor C1, the second feedback signal F2 to be output from a voltage detection circuit 7*c* is maintained at approximately the same signal level as that in the period where the load current IL is flowing. Thus, instead of the first feedback signal F1, the second feedback signal F2 is supplied from the feedback circuit 8 to the control circuit 4*b*.

In response to the first feedback signal F1 changed to an approximately zero value, the inverter circuit Inv of the alteration circuit 9*j* turns on the transistor Q2. Thus, the resistor R11 is short-circuited, and the reference voltage Vref to be supplied from the alteration circuit 9*j* to the error amplifier EA1 has a value derived from dividing the output voltage of the reference voltage source VR by the resistor 9 and the resistor R10. As compared to the predetermined value, this reference voltage Vref is reduced by a factor of a voltage drop arising between the terminals of the resistor R11.

In this circuit, the circuit elements are designed such that the reference voltage Vref in a period where the resistor R11 is short-circuited has a value less than that of the second feedback signal F2. Thus, the control circuit 4*b* acts to discontinue the ON/OFF operation of the switching transistor Q1 according to a control logic configured therein. This prevents the interterminal voltage of the smoothing capacitor C1 from increasing during the current cut-off period where the load current is not flowing, so as to prevent the load current IL from flowing at a value greater than the target stabilization value in the initial stage of the subsequent current flow period.

Advantageous embodiments of the present invention have been shown and described. It is obvious to those skilled in the art that various changes and modifications may be made therein without departing from the spirit and scope thereof as set for the in appended claims.

What is claimed is:

1. A switching-type constant current power supply device including a switching-type power conversion circuit for supplying a given current to a load connected to the output side thereof, a current detection circuit connected to said load and adapted to generate a first feedback signal proportional to a load current, and a control circuit connected to said power conversion circuit and said current detection circuit and adapted, in response to receiving said first feedback signal, to stabilize said load current, said switching-type constant current power supply device comprising:

a voltage detection circuit connected to the output side of said power conversion circuit, and adapted to generate a second feedback signal proportional to an output voltage of said power conversion circuit;

a feedback circuit connected to said current detection circuit, said voltage detection circuit and said control circuit, and adapted to supply either one of said first and second feedback signals to said control circuit; and an alteration circuit connected to a given position of a circuit block comprising said voltage detection circuit, said control circuit and said feedback circuit which are connected with each other, and adapted, in response to a change in said load, to alter a relative magnitude relationship between a reference voltage and said second feedback signal which are to be entered into a common error amplifier in said control circuit.

2. The switching-type constant current power supply device as defined in claim 1, wherein said alteration circuit is connected to said voltage detection circuit, and adapted, in response to the change in said load, to alter the signal level of said second feedback signal which is to be entered into one of input terminals of said error amplifier in said control circuit.

3. The switching-type constant current power supply device as defined in claim 2, wherein said load current is turned on and off at an arbitrary or given timing according to the operation of said load, wherein:

said feedback circuit is operable to supply said first feedback signal to said control circuit when said load current is flowing, and to supply said second feedback signal to said control circuit when said load current is not flowing: and said alteration circuit is operable to alter said second feedback signal to a relatively large value in response to cutting off the flow of said load current, and to alter said second feedback signal to a relatively small value in response to initiating the flow of said load current.

4. The switching-type constant current power supply device as defined in claim 3, wherein said second feedback signal is altered to a value greater than that of said reference voltage immediately after the flow of said load current is cut off, and to a value less than that of said reference voltage immediately after the flow of said load current is initiated.

5. The switching-type constant current power supply device as defined in claim 4, wherein when said second feedback signal is being supplied at a value greater than that of said reference voltage, said control circuit is operable to substantially discontinue the operation of said power conversion circuit.

6. The switching-type constant current power supply device as defined in claim 2, wherein said alteration circuit comprises a parallel circuit which is composed of a resistor and a switch and connected between one terminal of said voltage detection circuit and the ground, said switch being adapted to be switched in accordance with said first feedback signal.

7. The switching-type constant current power supply device as defined in claim 2, wherein said alteration circuit comprises a level shift circuit connected to said voltage detection circuit, and a switch which is connected in parallel to said level shift circuit and adapted to be switched in accordance with said first feedback signal.

8. The switching-type constant current power supply device as defined in claim 1, wherein said load is repeatedly turned on and off at a high speed.

9. The switching-type constant current power supply device as defined in claim 1, wherein said alteration circuit is connected to said control circuit, and adapted, in response to the change in said load, to alter the level of said reference voltage which is to be entered into one of input terminals of said error amplifier in said control circuit.

10. The switching-type constant current power supply device as defined in claim 9, wherein said load current is turned on and off at an arbitrary or given timing according to the operation of said load, wherein:
said feedback circuit is operable to supply said first feedback signal to said control circuit when said load current is flowing, and to supply said second feedback signal to said control circuit when said load current is not flowing: and
said alteration circuit is operable to alter said reference voltage to a relatively small value in response to cutting off the flow of said load current, and to alter said reference voltage to a relatively large value in response to initiating the flow of said load current.

11. The switching-type constant current power supply device as defined in claim 10, wherein said reference voltage is altered to a value less than that of said second feedback signal immediately after the flow of said load current is cut off, and to a value greater than that of said second feedback signal immediately after the flow of said load current is initiated.

12. The switching-type constant current power supply device as defined in claim 11, wherein when said reference voltage is being supplied at a value less than that of said second feedback signal, said control circuit is operable to substantially discontinue the operation of said power conversion circuit.

13. The switching-type constant current power supply device as defined in claim 9, wherein said alteration circuit comprises a plurality of resistors connected in series between a reference voltage source for generating said reference voltage and the ground, and a switch which is connected in parallel to one of said plurality of resistors and adapted to be switched in accordance with said first feedback signal.

14. The switching-type constant current power supply device as defined in claim 9, wherein said alteration circuit comprises a series circuit which is composed of a resistor and a level shift circuit and connected between a reference voltage source for generating said reference voltage and the ground, and a switch which is connected in parallel to said level shift circuit and adapted to be switched in accordance with said first feedback signal.

15. The switching-type constant current power supply device as defined in claim 1, wherein said power conversion circuit includes first and second rectifying/smoothing circuits capable of providing respective outputs approximately in conjunction with one another, said first rectifying/smoothing circuit being operable to supply a given current to said load, wherein:
said voltage detection circuit is connected to said second rectifying/smoothing circuit; and
said alteration circuit is connected to said voltage detection circuit, and adapted, in response to the change in said load, to alter the signal level of said second feedback signal which is to be entered into one of input terminals of said error amplifier in said control circuit.

16. The switching-type constant current power supply device as defined in claim 15, wherein said load current is turned on and off at an arbitrary or given timing according to the operation of said load, wherein:
said feedback circuit is operable to supply said first feedback signal to said control circuit when said load current is flowing, and to supply said second feedback signal to said control circuit when said load current is not flowing: and
said alteration circuit is operable to alter said second feedback signal to a relatively large value in response to cutting off the flow of said load current, and to alter said second feedback signal to a relatively small value in response to initiating the flow of said load current.

17. The switching-type constant current power supply device as defined in claim 16, wherein said second feedback signal is altered to a value greater than that of said reference voltage immediately after the flow of said load current is cut off, and to a value less than that of said reference voltage immediately after the flow of said load current is initiated.

18. The switching-type constant current power supply device as defined in claim 17, wherein when said second feedback signal is being supplied at a value greater than that of said reference voltage, said control circuit is operable to substantially discontinue the operation of said power conversion circuit.

19. The switching-type constant current power supply device as defined in claim 15, wherein said alteration circuit comprises a parallel circuit which is composed of a resistor and a switch and connected between one terminal of said voltage detection circuit and the ground, said switch being adapted to be switched in accordance with said first feedback signal.

20. The switching-type constant current power supply device as defined in claims 15, wherein said alteration circuit comprises a level shift circuit connected to said voltage detection circuit, and a switch which is connected in parallel to said level shift circuit and adapted to be switched in accordance with said first feedback signal.

21. A switching-type constant current power supply device including a switching-type power conversion circuit for supplying a given current to a load connected to the output side thereof, a current detection circuit connected to said load and adapted to generate a first feedback signal proportional to a load current, and a control circuit connected to said power conversion circuit and said current detection circuit and adapted, in response to receiving said first feedback signal, to stabilize said load current, said switching-type constant current power supply device comprising:
a voltage detection circuit connected to the output side of said power conversion circuit, and adapted to generate a second feedback signal proportional to an output voltage of said power conversion circuit;
a feedback circuit connected to said current detection circuit, said voltage detection circuit and said control circuit, and adapted to supply either one of said first and second feedback signals to said control circuit; and
an alteration circuit connected to said voltage detection circuit, and adapted to alter the signal level of said second feedback signal output from said voltage detection circuit, in accordance with to the state of said load.

22. A switching-type constant current power supply device including a switching-type power conversion circuit for supplying a given current to a load connected to the output side thereof, a current detection circuit connected to said load and adapted to generate a first feedback signal proportional to a load current, and a control circuit connected to said power conversion circuit and said current detection circuit and adapted, in response to receiving said first feedback signal, to stabilize said load current, said switching-type constant current power supply device comprising:

a voltage detection circuit connected to the output side of said power conversion circuit, and adapted to generate a second feedback signal proportional to an output voltage of said power conversion circuit;

a feedback circuit connected to said current detection circuit, said voltage detection circuit and said control circuit, and adapted to supply either one of said first and second feedback signals to said control circuit; and an alteration circuit adapted, in response to the change in said load, to alter the magnitude of a reference voltage which is to be entered concurrently with said second feedback signal into a common error amplifier in said control circuit, so as to change a relative magnitude relationship between said reference voltage and said second feedback signal.

23. A switching-type constant current power supply device including a switching-type power conversion circuit for supplying a given current to a load connected to the output side thereof, a current detection circuit connected to said load and adapted to generate a first feedback signal proportional to a load current, and a control circuit connected to said power conversion circuit and said current detection circuit and adapted, in response to receiving said first feedback signal, to stabilize said load current, said switching-type constant current power supply device comprising:

said power conversion circuit including first and second rectifying/smoothing circuits capable of providing respective outputs approximately in conjunction with one another, said first rectifying/smoothing circuit being operable to supply a given current to said load;

a voltage detection circuit connected to the output side of said second rectifying/smoothing circuit, and adapted to generate a second feedback signal proportional to an output voltage of said power conversion circuit;

a feedback circuit connected to said current detection circuit, said voltage detection circuit and said control circuit, and adapted to supply either one of said first and second feedback signals to said control circuit; and said alteration circuit connected to said voltage detection circuit, and adapted to alter the signal level of said second feedback signal output from said voltage detection circuit, in accordance with to the state of said load.

* * * * *